(12) United States Patent
Shinoda

(10) Patent No.: US 6,434,101 B1
(45) Date of Patent: Aug. 13, 2002

(54) OPTICAL STORAGE DEVICE AND CARTRIDGE HOLDING MECHANISM

(75) Inventor: Takao Shinoda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/425,492

(22) Filed: Oct. 22, 1999

(30) Foreign Application Priority Data

Mar. 30, 1999 (JP) .......................................... 11-088642

(51) Int. Cl.⁷ .............................................. G11B 33/02
(52) U.S. Cl. .................................. 369/77.2; 360/99.06
(58) Field of Search .............................. 369/77.2, 77.1, 369/75.1; 360/99.02, 96.5, 99.06, 97.01

(56) References Cited

U.S. PATENT DOCUMENTS

| | | | | |
|---|---|---|---|---|
| 4,291,353 A | * | 9/1981 | Fletcher et al. | 360/128 |
| 4,839,760 A | * | 6/1989 | Yamada et al. | 360/97.01 |
| 5,625,612 A | * | 4/1997 | Tozune et al. | 369/77.2 |
| 5,675,566 A | * | 10/1997 | Kosaka et al. | 369/77.1 |
| 5,898,659 A | * | 4/1999 | Goto | 369/77.2 |
| 6,046,976 A | * | 4/2000 | Arai et al. | 369/291 |

FOREIGN PATENT DOCUMENTS

| | | |
|---|---|---|
| JP | 5234212 | 9/1993 |
| JP | 7057431 | 3/1995 |
| JP | 7176124 | 7/1995 |
| JP | 7320369 | 12/1995 |
| JP | 8017121 | 1/1996 |
| JP | 9106604 | 4/1997 |

* cited by examiner

Primary Examiner—David Hudspeth
Assistant Examiner—Angel Castro
(74) Attorney, Agent, or Firm—Greer, Burns & Crain, Ltd.

(57) ABSTRACT

An optical storage device adapted to accept a cartridge composed of a cartridge case and an optical recording medium accommodated in the cartridge case. The optical storage device includes a base, a light source mounted on the base, an optical head having an objective lens for focusing light from the light source onto the optical recording medium, and a photodetector mounted on the base for detecting a regenerative signal from reflected light from the optical recording medium. The optical storage device further includes a cartridge holder having a main surface for holding the cartridge inserted in the optical storage device. The main surface of the cartridge holder is integrally formed with first and second spring arms adjacent to each other and extending substantially along a first side of the cartridge holder. The main surface of the cartridge holder is further integrally formed with a third spring arm extending substantially along a second side of the cartridge holder opposite to the first side. Each of the first, second, and third spring arms has a projection at a front end portion thereof.

16 Claims, 13 Drawing Sheets

OPTICAL STORAGE DEVICE AND CARTRIDGE HOLDING MECHANISM

BACKGROUND OF THE INVENTION

1. Field of the Invention

The present invention relates generally to an optical storage device, and more particularly to a cartridge holding mechanism for an optical storage device.

2. Description of the Related Art

An optical disk has received attention as a memory medium that becomes a core in the recent rapid development of multimedia, and it is usually accommodated in a cartridge case to be provided as an optical disk cartridge for practical use. The optical disk cartridge is loaded into an optical disk drive to perform reading/writing of data (information) from/to the optical disk by means of an optical pickup (optical head).

A recent optical disk drive intended to realize size reduction is composed of a fixed optical assembly including a laser diode module, a polarization beam splitter for reflecting and transmitting a laser beam, and a photodetector for receiving reflected light from an optical disk, and a movable optical assembly including a carriage and an optical head having an objective lens and a beam raising mirror mounted on the carriage. The carriage is movable in the radial direction of the optical disk along a pair of rails by means of a voice coil motor.

A write-power laser beam emitted from the laser diode module of the fixed optical assembly is first collimated by a collimator lens, next transmitted by the polarization beam splitter, next reflected by the beam raising mirror of the optical head, and finally focused on the optical disk by the objective lens, thereby writing data onto the optical disk. On the other hand, data reading is performed by directing a read-power laser beam onto the optical disk. Reflected light from the optical disk is first collimated by the objective lens, next reflected by the polarization beam splitter, and finally detected by the photodetector, thereby converting the detected optical signal into an electrical signal.

In general, a cartridge holder is used to hold the optical disk cartridge in the optical disk drive. Further, a spring mechanism as an independent component for firmly holding the cartridge is mounted on the cartridge holder, so as to prevent the play (rattling) of the cartridge in the cartridge holder due to vibration or shock. However, the optical disk is a removable medium, and there are slight variations in size of the cartridge, differences in material of the cartridge, and differences in surface finished condition of the cartridge due to differences in cartridge maker. According to these differences and differences in use frequency (the number of insertions and ejections) of the cartridge, there occur variations in frictional force generated between the cartridge surface and the cartridge holder or another sliding member such as a drive base in the optical disk drive. Accordingly, even in the same optical disk drive, the amount of ejection of the cartridge tends to vary because of such variations in frictional force.

To suppress such variations in the amount of ejection of the cartridge, the conventional cartridge holding mechanism is provided with means for minimizing a change in elastic force of the spring mechanism for holding the cartridge, or provided with a hook mechanism or brake mechanism for stopping or braking the cartridge during ejection. However, such a conventional cartridge holding mechanism employing a spring mechanism as an independent component has a problem of cost increase due to an increase in parts count, an increase in man-hour for parts mounting, and an increase in man-hour for parts managing, for example.

SUMMARY OF THE INVENTION

It is therefore an object of the present invention to provide a cartridge holding mechanism for an optical storage device which can stably hold a cartridge in the device and can obtain a stable frictional force in ejecting the cartridge out of the device.

In accordance with an aspect of the present invention, there is provided an optical storage device capable of accepting a cartridge including a cartridge case and an optical recording medium accommodated in said cartridge case, and reading information recorded on said optical recording medium, comprising a base; a light source mounted on said base; an optical head having an objective lens for focusing light from said light source onto said optical recording medium; a photodetector mounted on said base for detecting a regenerative signal from reflected light from said optical recording medium; a cartridge holder having a main surface for holding said cartridge inserted in said optical storage device; a first spring arm formed integrally with said main surface of said cartridge holder at a portion in the vicinity of a first side of said cartridge holder, said first spring arm having a first projection at a front end portion thereof; a second spring arm formed integrally with said main surface of said cartridge holder at a portion adjacent to said first spring arm, said second spring arm having a second projection at a front end portion thereof; and a third spring arm formed integrally with said main surface of said cartridge holder at a portion in the vicinity of a second side of said cartridge holder opposite to said first side, said third spring arm having a third projection at a front end portion thereof; said first and second spring arms extending in opposite directions substantially along the directions of insertion and ejection of said cartridge with respect to said cartridge holder.

A spindle motor is fixed to the base, and the cartridge holder is mounted on a load plate movably mounted on the base. The load plate is movable between a first position where the cartridge is fully inserted in the optical storage device and a second position where the cartridge is ejected from the optical storage device. When the load plate is moved to the first position, the cartridge holder is moved toward the spindle motor, and the optical recording medium of the cartridge is chucked by the spindle motor. When the load plate is moved to the second position, the cartridge holder is moved away from the spindle motor, and the optical recording medium is released from the spindle motor.

Preferably, the first spring arm extends substantially parallel to the first side of the cartridge holder, and the second spring arm is composed of a first portion extending substantially parallel to the first side and a second portion extending from the first portion toward the first side so as to be inclined a given angle with respect to the first side. The third spring arm is inclined a given angle with respect to the second side. Preferably, each of the first and second projections is spaced a distance not greater than 9 mm from the first side, and the third projection is spaced a distance not greater than 9 mm from the second side.

In accordance with another aspect of the present invention, there is provided a cartridge holding mechanism for a storage device, comprising a base; a cartridge holder having a main surface for holding a recording medium cartridge inserted in said storage device; a first spring arm formed integrally with said main surface of said cartridge holder at a portion in the vicinity of a first side of said cartridge holder, said first spring arm having a first projection at a front end portion thereof; a second spring arm formed integrally with said main surface of said cartridge holder at a portion adjacent to said first spring arm, said second spring arm having a second projection at a front end portion thereof; and a third spring arm formed integrally with said main surface of said cartridge holder at a portion in the vicinity of a second side of said cartridge holder opposite to said first side; said first and second spring arms extending in opposite directions substantially along the directions of insertion and ejection of said recording medium cartridge with respect to said cartridge holder.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
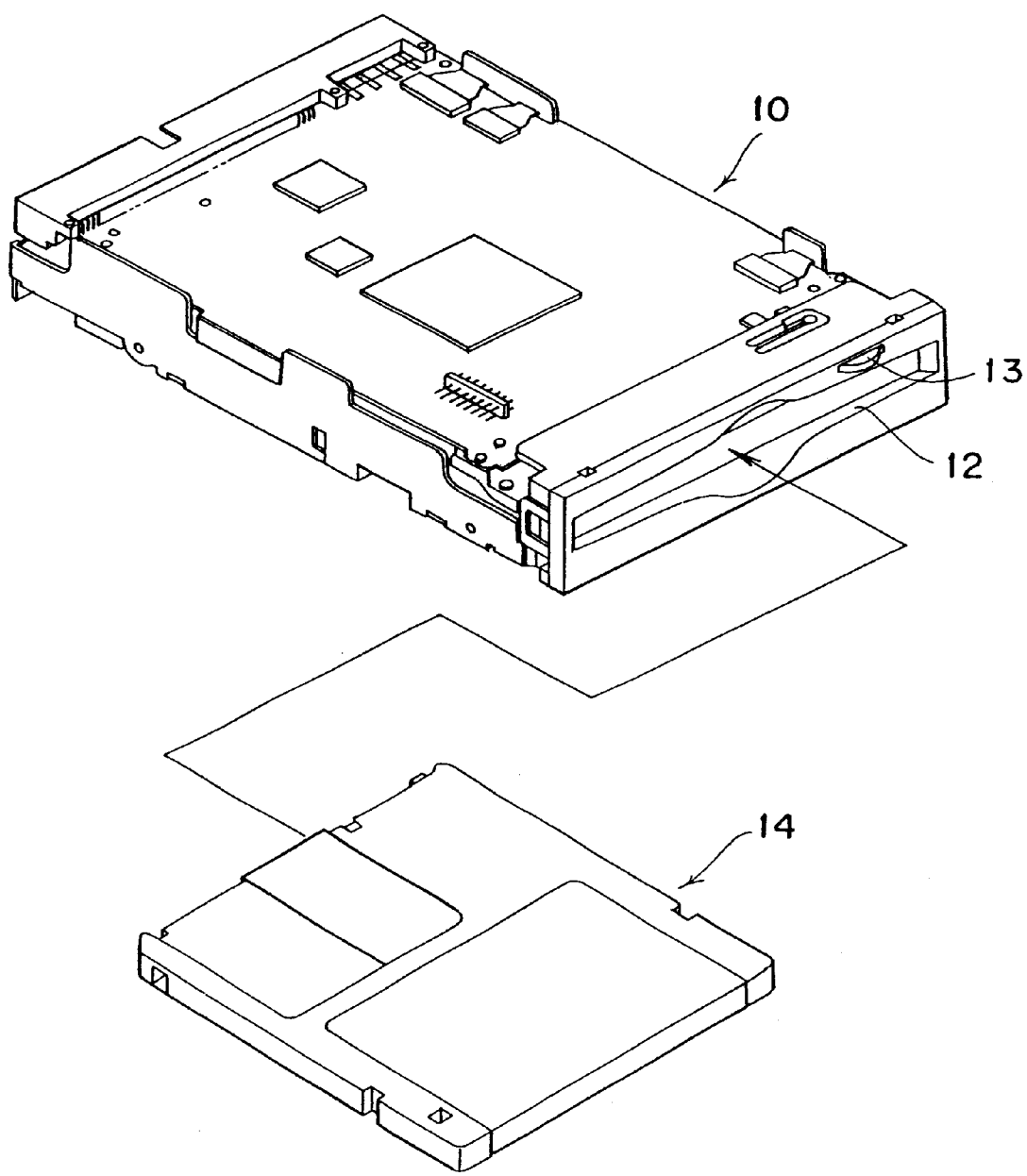
FIG. 1 is an upper perspective view of a magneto-optical disk drive including a cartridge holding mechanism according to the present invention.
Figure 2:
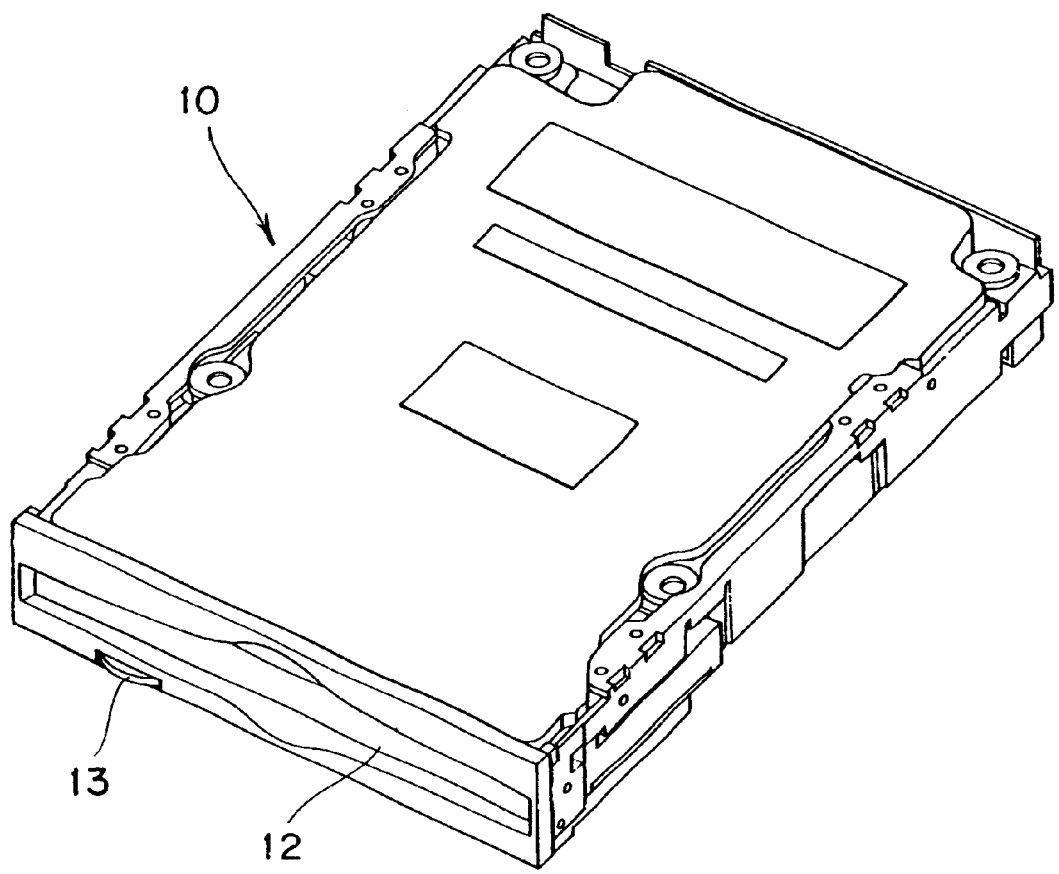
FIG. 2 is a lower perspective view of the magneto-optical disk drive.

Referring to FIG. 1, there is shown a perspective view of a magneto-optical disk drive 10 to which the present invention is applied, as viewed from the upper side. FIG. 2 is a perspective view of the magneto-optical disk drive 10 as viewed from the lower side. The magneto-optical disk drive 10 accepts a magneto-optical disk cartridge 14 having a cartridge case and a magneto-optical disk (both will be hereinafter described) accommodated in the cartridge case, and performs reading/writing of data from/to the magneto-optical disk in the magneto-optical disk cartridge 14. Reference numeral 13 denotes an eject button for ejecting the magneto-optical disk cartridge 14 out of the magneto-optical disk drive 10.

As will be hereinafter described in detail, the magneto-optical disk drive 10 includes a load/eject mechanism for the magneto-optical disk cartridge 14, a spindle motor for rotating the magneto-optical disk, a bias magnetic field generating mechanism, a positioner, a fixed optical assembly, and a movable optical assembly. The magneto-optical disk drive 10 further has an insert opening 12 for accepting the magneto-optical disk cartridge 14.

Figure 3A:
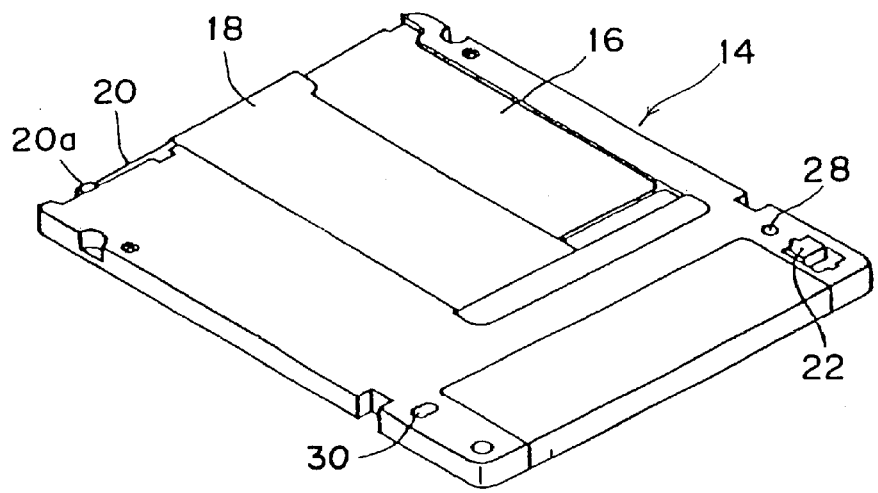
FIG. 3A is a perspective view of a magneto-optical disk cartridge in a shutter closed condition.
Figure 3B:
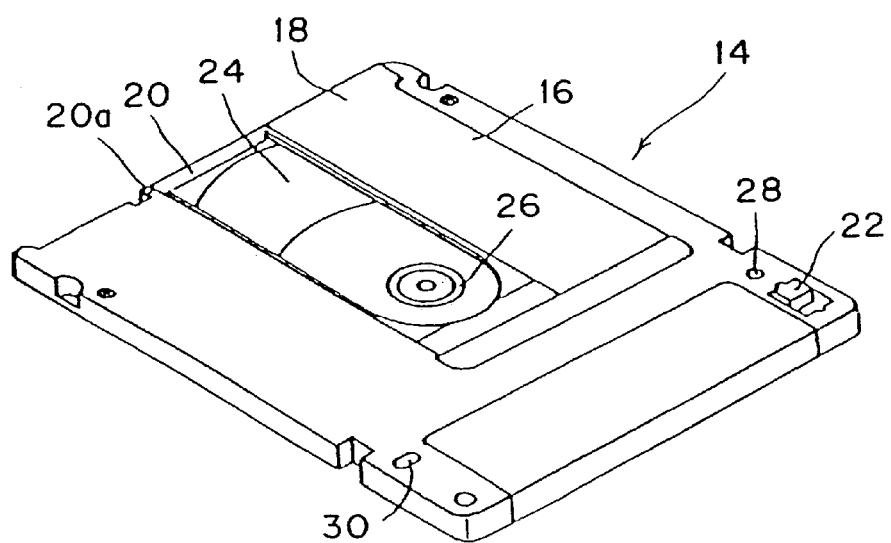
FIG. 3B is a perspective view of the magneto-optical disk cartridge in a shutter open condition.

FIGS. 3A and 3B are perspective views of the magneto-optical disk cartridge 14 in its different conditions, as viewed from the lower side. It should be noted that FIG. 1 shows the upper side of the magneto-optical disk cartridge 14. As shown in FIG. 3A, the magneto-optical disk cartridge 14 has a cartridge case 16. The cartridge case 16 is provided with a slidable shutter 18. A shutter opening arm 20 is mounted at a front end portion of the shutter 18. A write protector 22 for prohibiting writing onto a magneto-optical disk is provided at a rear end portion of the cartridge case 16.

When an end portion 20a of the shutter opening arm 20 is pushed by a slider to be hereinafter described, the shutter 18 is slid on the cartridge case 16. FIG. 3B shows a condition where the shutter 18 is fully opened. As shown in FIG. 3B, a magneto-optical disk 24 as a data recording medium is rotatably accommodated in the cartridge case 16. The magneto-optical disk 24 has a central hub 26 adapted to be chucked for rotation by a spindle motor to be hereinafter described.

Two reference holes 28 and 30 for positioning the magneto-optical disk cartridge 14 in the magneto-optical disk drive 10 are formed near the opposite side edges at the rear end portion of the cartridge case 16. The reference hole 28 is a round hole, and the reference hole 30 is an elongated hole.

Figure 4:
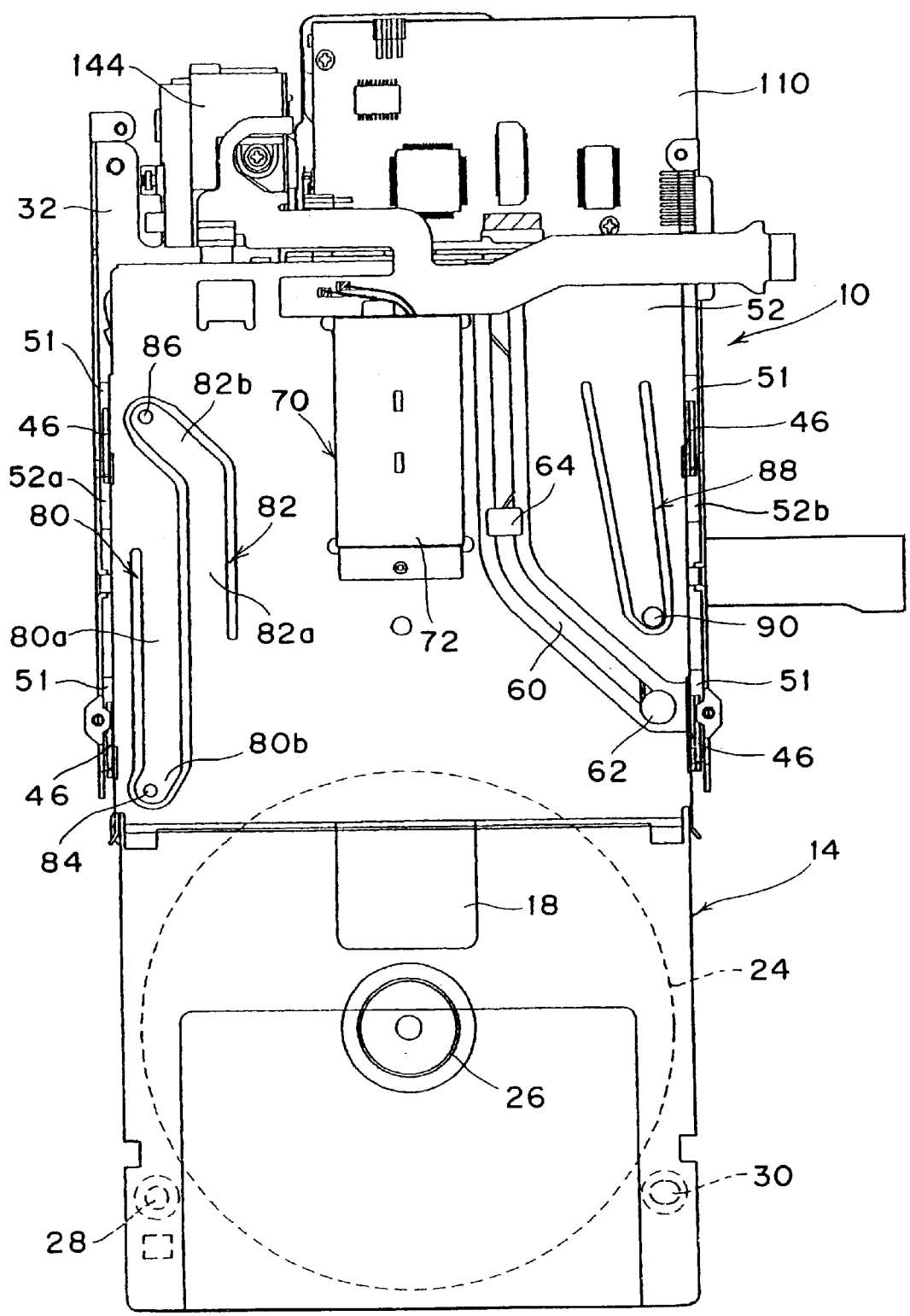
FIG. 4 is a top plan view of the magneto-optical disk drive in the condition where the magneto-optical disk cartridge is slightly inserted in the magneto-optical disk drive or the cartridge is ejected from the magneto-optical disk drive.
Figure 5:
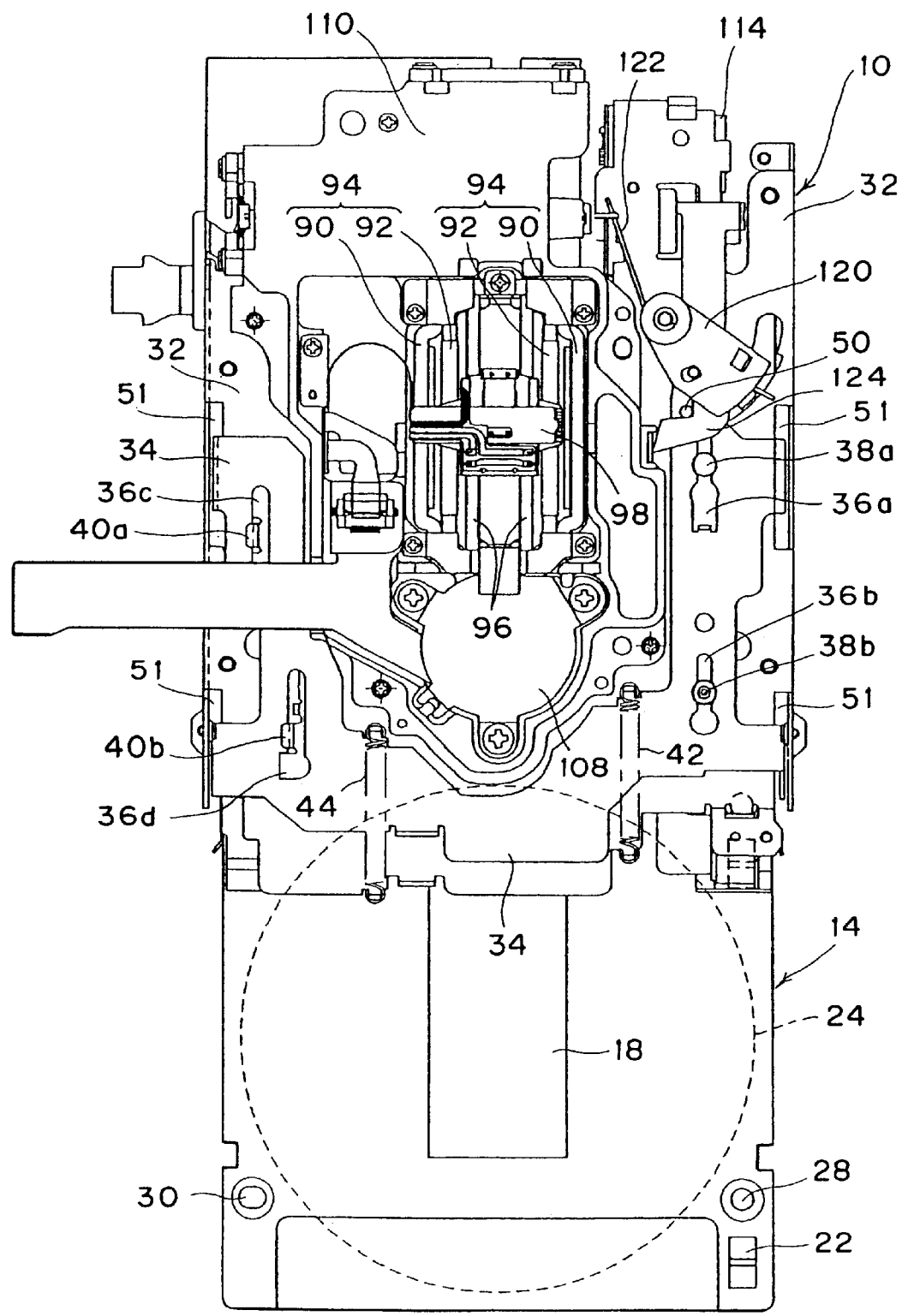
FIG. 5 is a back side view of FIG. 4.
Figure 6:
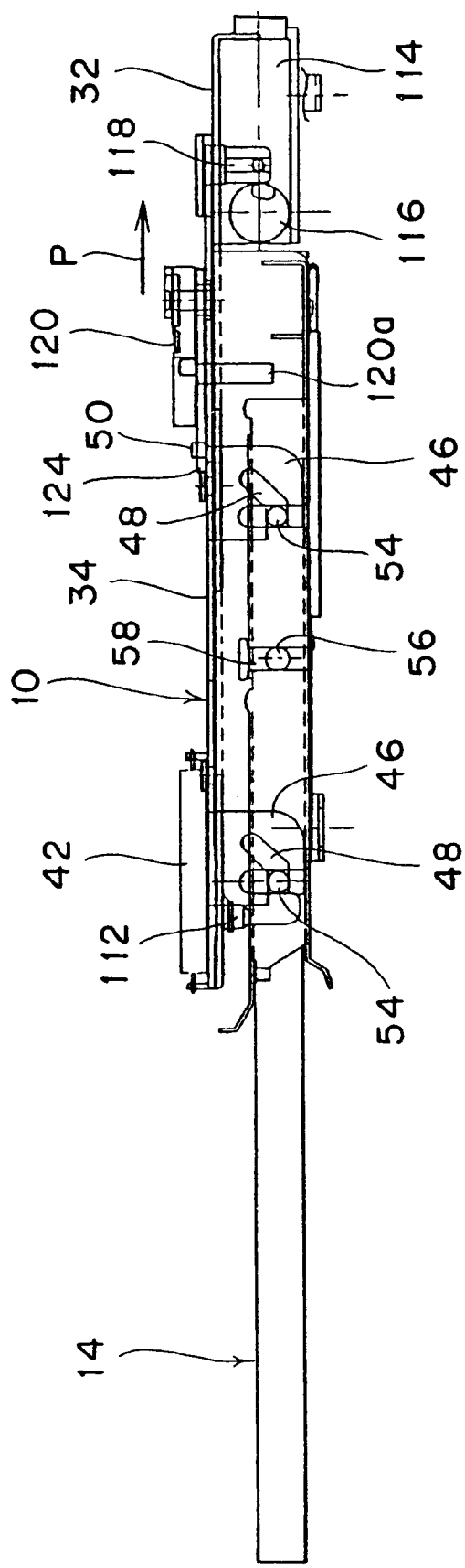
FIG. 6 is a right side view of FIG. 5.

FIG. 4 is a top plan view showing a condition where the magneto-optical disk cartridge 14 is slightly inserted in the magneto-optical disk drive 10 from the insert opening 12. FIG. 5 is a bottom plan view showing the same condition as that of FIG. 4, and FIG. 6 is a right side view of FIG. 5. As best shown in FIG. 5, a load plate 34 is movably mounted on a drive base 32. The load plate 34 has four elongated holes 36a, 36b, 36c, and 36d. Two pins 38a and 38b and two engaging projections 40a and 40b are fixed to the drive base 32. The pins 38a and 38b are inserted in the elongated holes 36a and 36b, respectively, and the engaging projections 40a and 40b are inserted in the elongated holes 36c and 36d, respectively. With this structure, the load plate 34 is movable in the longitudinal direction of the base 32 as being guided by the pins 38a and 38b and the engaging projections 40a and 40b.

Two openings 51 are formed on each side portion of the base 32. On the other hand, the load plate 34 is integrally formed with four lift guides 46 bent about 90° from the horizontal surface. The four lift guides 46 of the load plate 34 are respectively inserted through the four openings 51 of the base 32 so as to project from the lower side of the base 32 to the upper side thereof (see FIG. 4). Further, a pin 50 is fixed to the base 32. As shown in FIG. 6, each lift guide 46 has a slot 48 consisting of a horizontal portion and an inclined portion.

Figure 8:
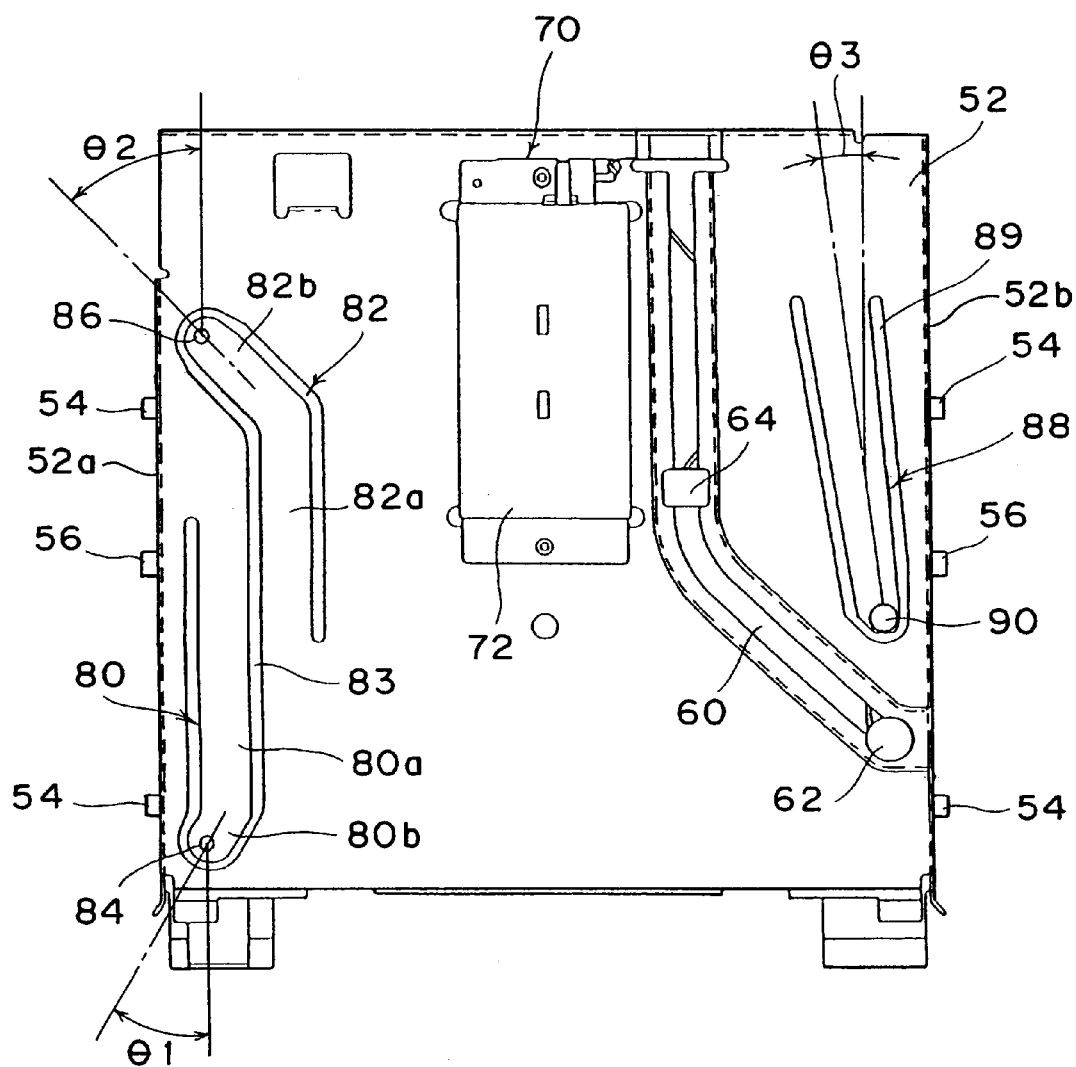
FIG. 8 is a top plan view of a cartridge holder.
Figure 9:
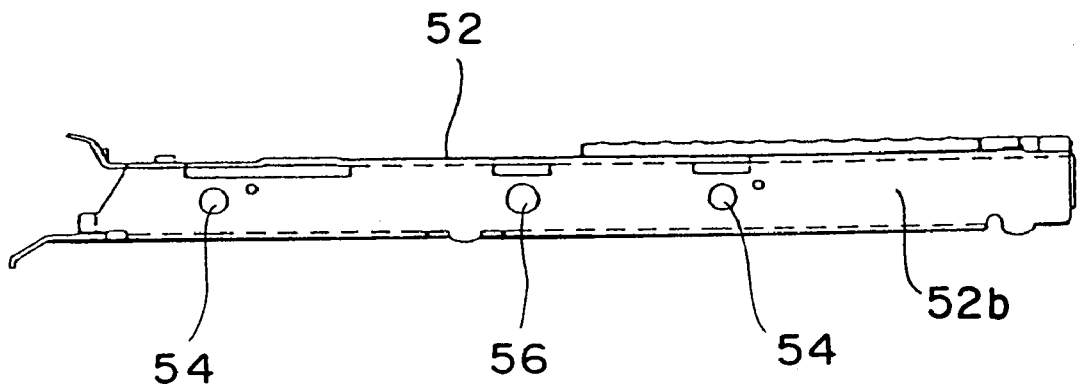
FIG. 9 is a right side view of FIG. 8.

There will now be described the structure of a cartridge holder 52 according to a preferred embodiment of the present invention with reference to FIGS. 8 to 10. Two pins 54 and a pin 56 are fixed to each side portion of the cartridge holder 52. The cartridge holder 52 is formed with a guide groove 60. The guide groove 60 is composed of a first portion obliquely extending from one end of the insert opening 12 laterally inward of the cartridge holder 52 and a second portion extending from an inward end of the first portion to the rear end of the cartridge holder 52 in parallel to the longitudinal direction of the cartridge holder 52.

A first slider 62 and a second slider 64 are slidably engaged with the guide groove 60. As shown in FIG. 10, the first slider 62 and the second slider 64 are connected by a torsion spring 66, and a torsion spring 68 is interposed between the second slider 64 and the cartridge holder 52 so as to normally bias the second slider 64 toward the front end of the cartridge holder 52. A bias magnetic field generating mechanism 70 is mounted on the cartridge holder 52. The bias magnetic field generating mechanism 70 includes a back yoke 72 and a center yoke 74 mounted on the back yoke 72. The cartridge holder 52 and the back yoke 72 are formed from a steel plate, for example.

Figure 10:
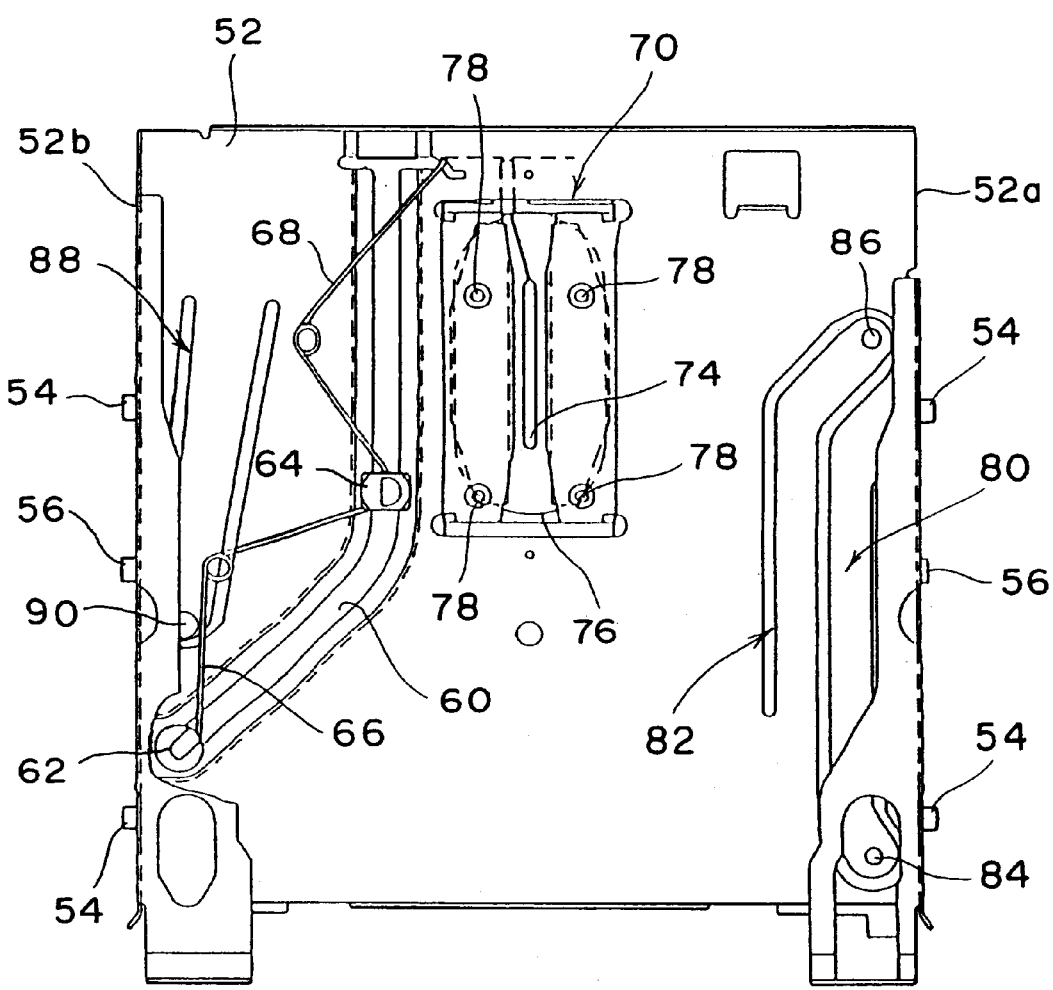
FIG. 10 is a back side view of FIG. 8.

As shown in FIG. 10, four flattened projections 78 are formed on a portion of the cartridge holder 52 where the bias magnetic field generating mechanism 70 is located, in order to prevent the magneto-optical disk cartridge 14 inserted in the magneto-optical disk drive 10 from colliding with the cartridge holder 52 and/or the center yoke 74. As best shown in FIG. 8, the cartridge holder 52 is integrally formed at its one side portion (on the first side 52a) with a first spring arm 80 and a second spring arm 82 adjacent to each other by cutting a continuous slit 83.

The first spring arm 80 consists of a first portion 80a extending in parallel to the first side 52a of the cartridge holder 52 and a second portion 80b inclined a given angle θ1 with respect to the first side 52a (with respect to the longitudinal center line of the first portion 80a). The angle θ1 is set to about 30°, for example. A projection 84 is formed on a front end portion of the second portion 80b so as to project to the back side of the cartridge holder 52. The height of the projection 84 is set to about 1.2 mm, for example. Similarly, the second spring arm 82 consists of a first portion 82a extending in parallel to the first side 52a of the cartridge holder 52 and a second portion 82b inclined a given angle θ2 with respect to the first side 52a (with respect to the longitudinal center line of the first portion 82a). The angle θ2 is set to about 45°, for example. A projection 86 is formed on a front end portion of the second portion 82b so as to project to the back side of the cartridge holder 52. The height of the projection 86 is set to about 1.2 mm, for example.

The second portion 80b of the first spring arm 80 is inclined toward the first side 52a of the cartridge holder 52, and the second portion 82b of the second spring arm 82 is also inclined toward the first side 52a of the cartridge holder 52. The projections 84 and 86 are arranged in a line parallel to the first side 52a of the cartridge holder 52 so as to be spaced not greater than 9 mm from the first side 52a of the cartridge holder 52. The angles θ1 and θ2 are not limited to the above-mentioned values, but may be set to any other values so that the projections 84 and 86 are arranged in a line parallel to the first side 52a of the cartridge holder 52.

On the other hand, the cartridge holder 52 is integrally formed at the other side portion (on the second side 52b opposite to the first side 52a) with a third spring arm 88 by cutting a slit 89. The third spring arm 88 extends so as to be inclined a given angle θ3 with respect to the second side 52b of the cartridge holder 52. The angle θ3 is set to about 8°, for example. A projection 90 is formed on a front end portion of the third spring arm 88 so as to project to the back side of the cartridge holder 52. The height of the projection 90 is set to about 1.2 mm, for example. The projection 90 is spaced a distance not greater than 9 mm from the second side 52b of the cartridge holder 52.

The length of each of the first, second, and third spring arms 80, 82, and 86 is preferably set to not less than ½ of the length of the cartridge 14 held in the cartridge holder 52 along the directions of insertion and ejection of the cartridge 14. Further, the distance between the first and second projections 84 and 86 is set to not less than ½ of the length of the cartridge holder 52 along its longitudinal direction. By setting the length of each spring arm as mentioned above, the spring constant of each spring arm can be reduced so as to obtain a stable desired frictional force during ejection of the cartridge 14.

The cartridge holder 52 having the above structure is mounted on the load plate 34 in such a manner that the four pins 54 of the cartridge holder 52 are respectively inserted in the slots 48 of the four lift guides 46 of the load plate 34, and that the two pins 56 of the cartridge holder 52 are respectively inserted in two guide slots 58 formed at the opposite side portions of the base 32. FIG. 6 shows a condition where only a front end portion of the cartridge 14 is inserted in the cartridge holder 52. In this condition, the pins 54 are respectively located in the horizontal portions of the slots 48 of the lift guides 46.

Figure 7:
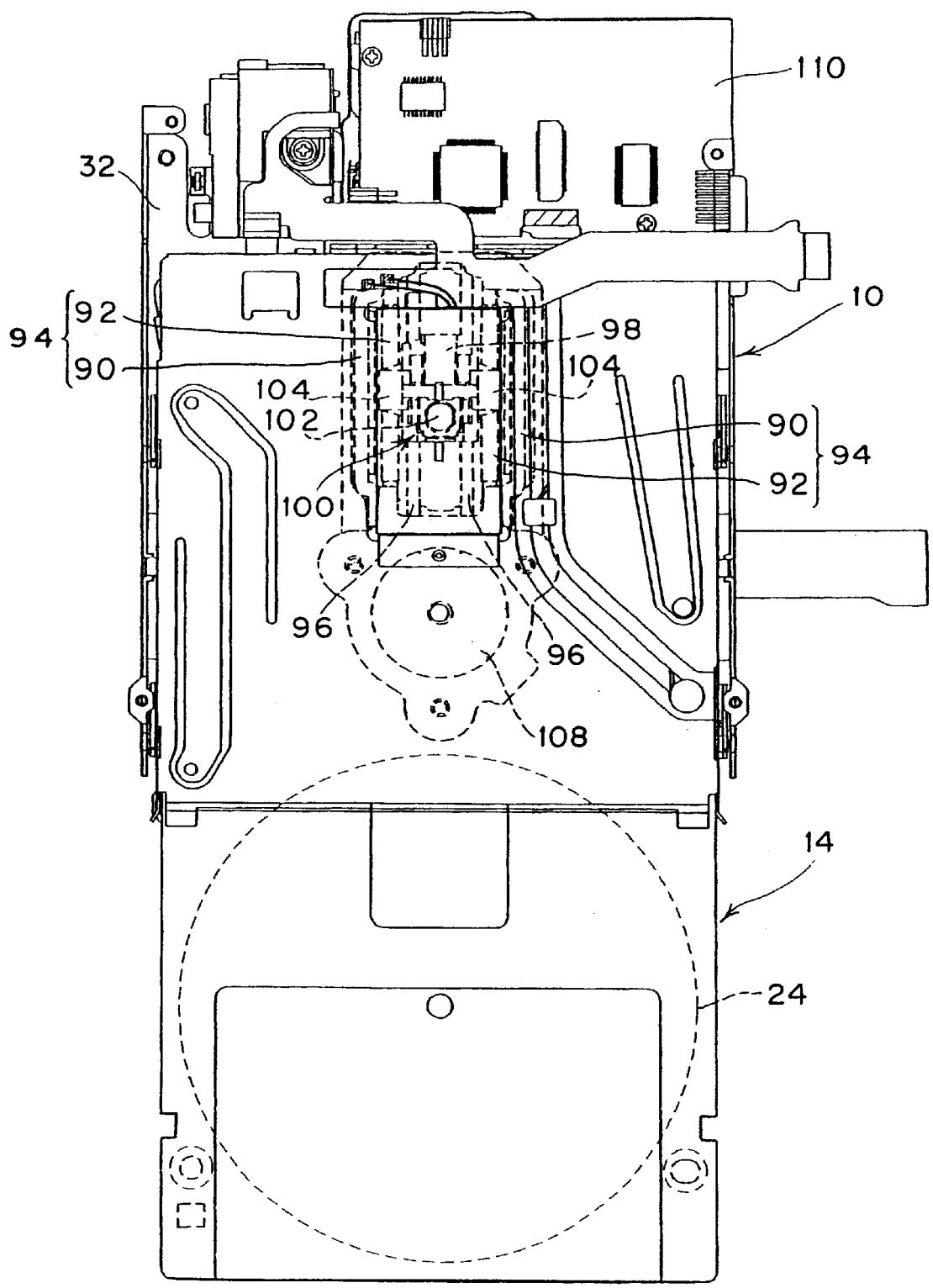
FIG. 7 is a view similar to FIG. 4 with magnetic circuits, a carriage, and an optical head shown by broken lines.

As shown in FIGS. 5 and 7, a pair of magnetic circuits 94 and a pair of guide rails 96 are mounted on the drive base 32. Each magnetic circuit 94 consists of a permanent magnet 90 and a yoke 92. Reference numeral 98 denotes a carriage for carrying an optical head 100 having an objective lens 102. The carriage 98 is provided with a pair of coils 104 at opposite positions respectively corresponding to the pair of magnetic circuits 94. The magnetic circuits 94 and the coils 104 constitute a voice coil motor (VCM). When a current is passed through the coils 104, the carriage 98 is guided by the guide rails 96 to move in the radial direction of the magneto-optical disk 24.

A spindle motor 108 is fixed to the drive base 32. A fixed optical assembly 110 having a laser diode and a photodetector is further mounted on the drive base 32. A pair of positioning pins 112 are fixed to the drive base 32. When the cartridge 14 is fully inserted in the magneto-optical disk drive 10, the pins 112 are respectively inserted into the reference holes 28 and 30 of the cartridge 14 to thereby position the cartridge 14 (see FIGS. 6 and 11).

An eject motor 114 is further mounted on the drive base 32 to eject the cartridge 14 out of the magneto-optical disk drive 10. A cam 116 is connected to an output shaft of the eject motor 114. In the unloaded condition shown in FIG. 6, the cam 116 abuts against an engaging member 118 integral with the load plate 34 to keep the load plate 34 at an unloading position moved in the direction P shown in FIG. 6. As shown in FIG. 5, a first load cam 120 is mounted on the back surface of the drive base 32 so as to be biased clockwise as viewed in FIG. 5 by a torsion spring 122. A second load cam 124 is fixed to the first load cam 120. As shown in FIG. 6, the first load cam 120 is integrally formed with a projection 120a.

A pair of coil springs 42 and 44 extend under tension between the drive base 32 and the load plate 34. In the unloaded condition shown in FIGS. 4 to 7 where the cartridge 14 is partially inserted in the magneto-optical disk drive 10, the load plate 34 is kept in the upward moved position as viewed in FIG. 5, and the second load cam 124 is engaged with the pin 50 fixed to the base 32. Accordingly, the coil springs 42 and 44 are in the expanded condition, and the downward movement of the load plate 34 as viewed in FIG. 5 is prevented by the engagement of the second load cam 124 and the pin 50. Since the load plate 34 is kept in the position moved in the direction P as shown in FIG. 6, the pins 54 of the cartridge holder 52 are located in the horizontal portions of the slots 48 of the lift guides 46, and the magneto-optical disk 24 is not yet chucked by the spindle motor 108, but is spaced therefrom.

Figure 11:
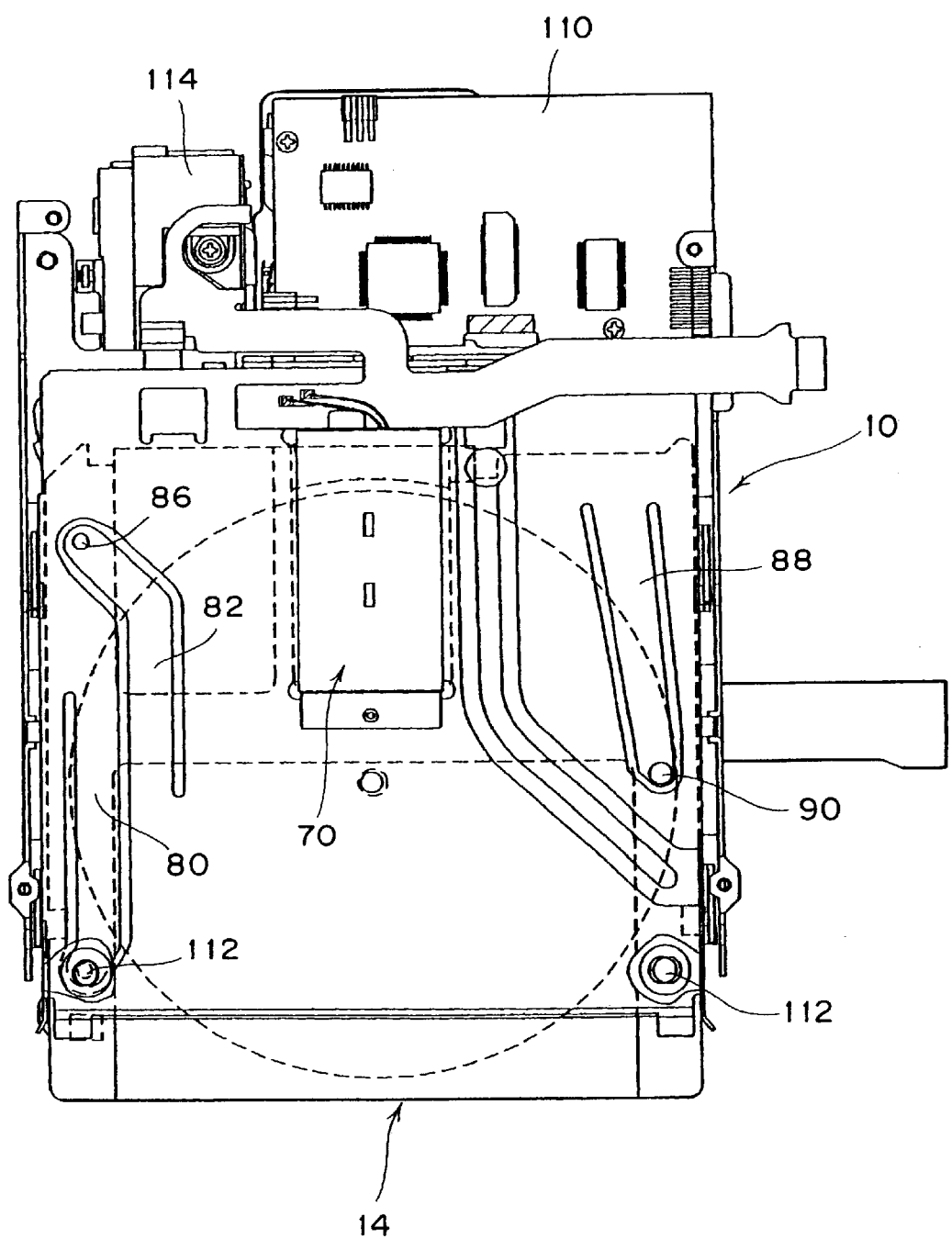
FIG. 11 is a top plan view of the magneto-optical disk drive in the condition where the magneto-optical disk cartridge is fully inserted.
Figure 12:
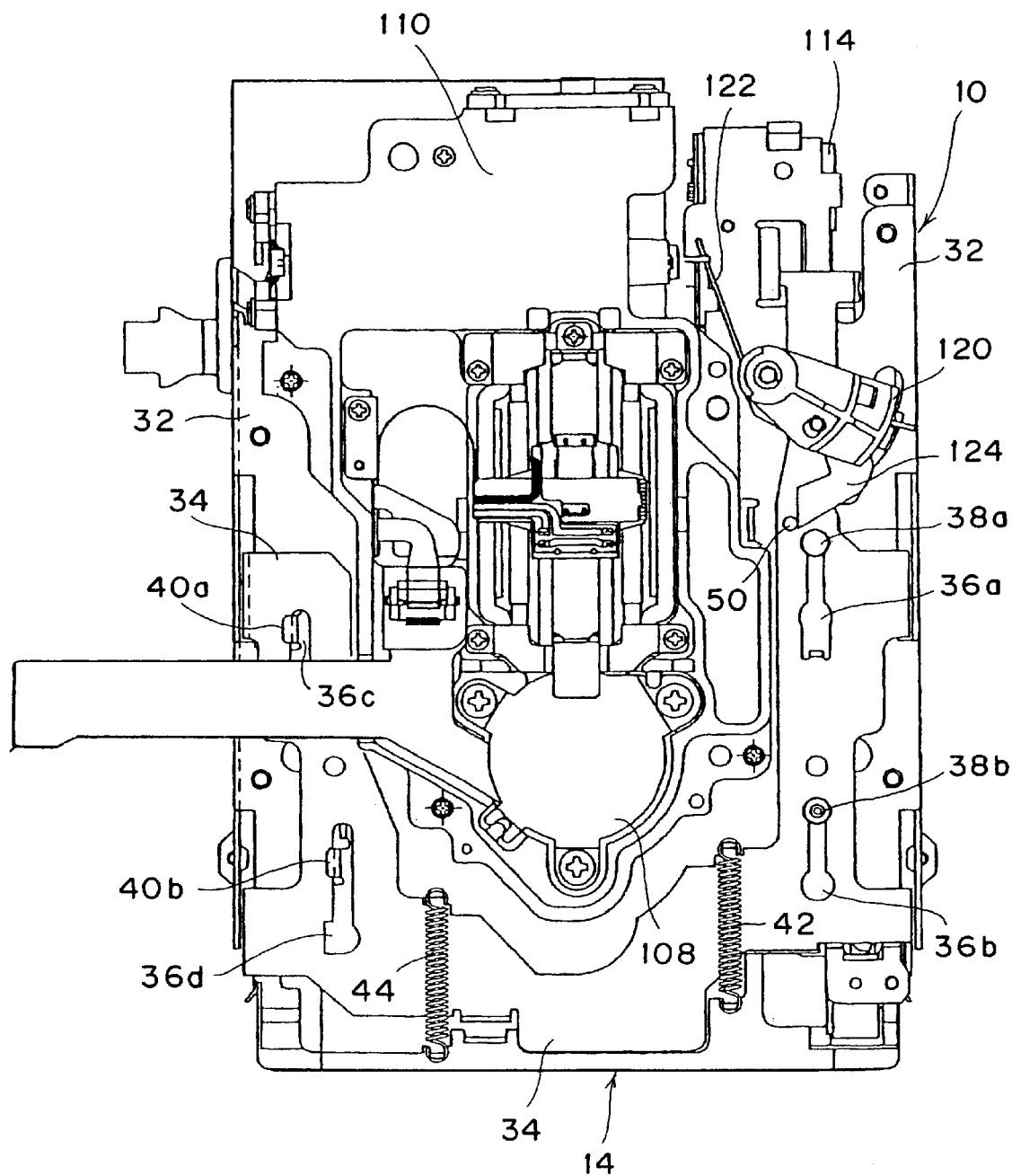
FIG. 12 is a back side view of FIG. 11.
Figure 13:
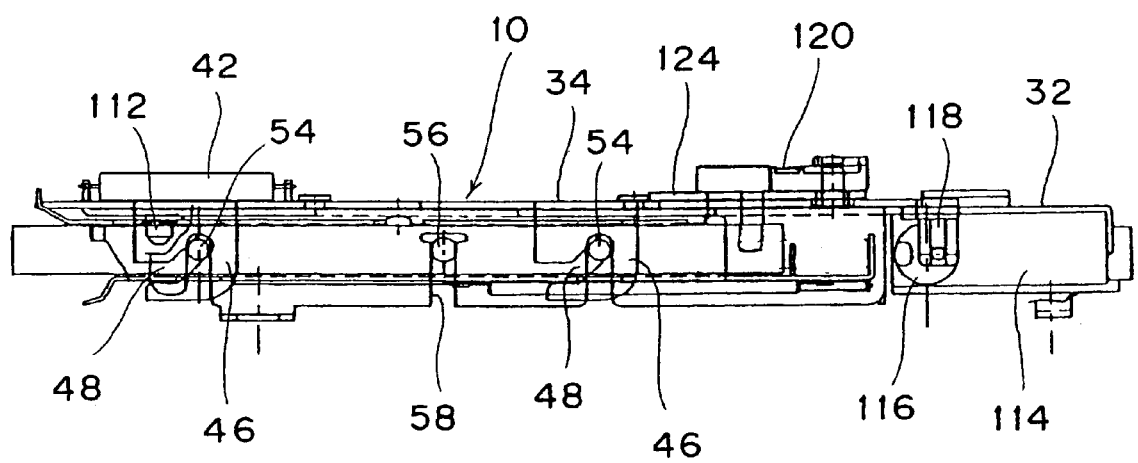
FIG. 13 is a right side view of FIG. 12.

When the cartridge 14 is further inserted into the magneto-optical disk drive 10 from the above unloaded condition, the cartridge 14 comes into abutment against the projection 120a of the first load cam 120 to rotate the first load cam 120 counterclockwise as viewed in FIG. 5 against the biasing force of the torsion spring 122. As a result, the second load cam 124 is disengaged from the pin 50, and the load plate 34 is moved downward as viewed in FIG. 5 by the biasing forces of the coil springs 42 and 44. FIGS. 11 to 13 show a condition where the cartridge 14 is fully inserted in the magneto-optical disk drive 10. In concert with the above movement of the load plate 34, the pins 54 of the cartridge holder 52 are moved within the slots 48 of the lift guides 46 from the horizontal portions to the upper ends of the inclined portions as viewed in FIG. 13.

Accordingly, the cartridge 14 is moved toward the spindle motor 108, and the magneto-optical disk 24 of the cartridge 14 is chucked by the spindle motor 108. In this loaded condition, the load plate 34 is kept in the downward moved position as viewed in FIG. 12 by the biasing forces of the coil springs 42 and 44, in which the coil springs 42 and 44 are in the contracted condition. In this condition, the spindle motor 108 is driven to rotate the magneto-optical disk 24 and perform reading/writing of data from/to the magneto-optical disk 24.

In ejecting the cartridge 14 out of the magneto-optical optical disk drive 10, the eject button 13 is depressed by an operator. As a result, the eject motor 114 is driven to make the cam 116 abut against the engaging member 118 of the load plate 34, thereby moving the load plate 34 in the direction P shown in FIG. 6. That is, the load plate 34 is moved upward as viewed in FIG. 12. Accordingly, the abutment of the second load cam 124 against the pin 50 is released, and the first load cam 120 is rotated clockwise as viewed in FIG. 12 by the biasing force of the torsion spring 122, thereby ejecting the cartridge 14 out of the magneto-optical disk drive 10.

The cartridge 14 is further ejected by the biasing forces of the torsion springs 66 and 68 mounted on the cartridge holder 52 until the position shown in FIGS. 4 to 7 is reached. The engagement of the spindle motor 108 and the magneto-optical disk 24 is released during the movement of the load plate 34 in the direction P shown in FIG. 6.

In the above ejecting operation, the projections 84, 86, and 90 respectively formed on the first, second, and third spring arms 80, 82, and 88 are in elastic contact with the cartridge 14. That is, a moderate frictional force is generated between the cartridge 14 and the projections 84, 86, and 90 under the spring elasticity of the spring arms 80, 82, and 88. Accordingly, the cartridge 14 can be stably ejected as being braked by this frictional force. At this time, the second load cam 124 comes into engagement with the pin 50, thereby preventing the downward movement of the load plate 34 as viewed in FIG. 5. In this condition, the pins 54 of the cartridge holder 52 are located in the horizontal portions of the slots 48 of the lift guides 46 as shown in FIG. 6.

Having thus described a specific preferred embodiment of the present invention applied to a magneto-optical disk drive, the present invention is not limited to the above preferred embodiment, but similarly applicable to any other optical disk drives in which an optical disk is selectively loaded to a spindle motor.

According to the present invention as described above, the cartridge holder is integrally formed with a plurality of spring arms each having a projection at a front end portion thereof. Accordingly, a stable desired frictional force can be obtained between a cartridge and the projections of the spring arms in ejecting the cartridge out of the optical storage device, thus improving the stability of ejection of the cartridge. Further, since the spring mechanism for obtaining the frictional force during ejection of the cartridge is integral with the cartridge holder, an inexpensive cartridge holding mechanism with a reduced number of parts can be provided.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical storage device capable of accepting a cartridge including a cartridge case and an optical recording medium accommodated in said cartridge case, and reading information recorded on said optical recording medium, comprising:

a base;

a light source mounted on said base;

an optical head having an objective lens for focusing light from said light source onto said optical recording medium;

a photodetector for detecting a reproducing signal from reflected light from said optical recording medium;

a cartridge holder having a main surface for holding said cartridge inserted in said optical storage device, said main surface extending generally along a plane;

a first spring arm formed integrally with said main surface of said cartridge holder at a portion in the vicinity of a first side of said cartridge holder;

a second spring arm formed integrally with said main surface of said cartridge holder at a portion adjacent to said first spring arm; and a third spring arm formed integrally with said main surface of said cartridge holder at a portion in the vicinity of a second side of said cartridge holder opposite to said first side substantially along said plane;

wherein said first and second spring arms extend substantially along said plane in opposite directions substantially along the directions of insertion and ejection of said cartridge with respect to said cartridge holder.

2. An optical storage device according to claim 1, wherein:

said first spring arm extends substantially parallel to said first side; and said second spring arm is formed laterally inside of said first spring arm substantially along said plane and includes a first portion extending substantially parallel to said first side and a second portion extending from said first portion toward said first side so as to be inclined substantially along said plane with respect to said first side.

3. An optical storage device according to claim 2, wherein said third spring arm is inclined substantially along said plane with respect to said second side.

4. An optical storage device according to claim 1, wherein said first spring arm has a first projection at a front end portion thereof, said second spring arm has a second projection at a front end portion thereof and said third spring arm has a third projection at a front end portion thereof.

5. An optical storage device according to claim 4, wherein a distance between said first and second projections is set to not less than ½ of the longitudinal length of said cartridge holder.

6. An optical storage device according to claim 4, wherein each of said first and second projections is spaced a distance not greater than 9 mm from said first side, and said third projection is spaced a distance not greater than 9 mm from said second side.

7. An optical storage device according to claim 1, further comprising:

a spindle motor fixed to said base; and a load plate movable between a first position where said cartridge is fully inserted in said optical storage device and a second position where said cartridge is ejected from said optical storage device;

wherein said cartridge holder is mounted on said load plate, and when said load plate is moved to said first position, said cartridge holder is moved toward said spindle motor, whereas when said load plate is moved to said second position, said cartridge holder is moved away from said spindle motor.

8. An optical storage device according to claim 7, wherein said load plate has a plurality of lift guides, and said cartridge holder is supported to said lift guides.

9. A cartridge holding mechanism for a storage device, comprising:

a base;

a cartridge holder having a main surface extending generally along a plane for holding a recording medium cartridge inserted in said storage device;

a first spring arm formed integrally with said main surface of said cartridge holder at a portion in the vicinity of a first side of said cartridge holder;

a second spring arm formed integrally with said main surface of said cartridge holder at a portion adjacent to said first spring arm; and a third spring arm formed integrally with said main surface of said cartridge holder at a portion in the vicinity of a second side of said cartridge holder opposite to said first side;

wherein said first and second spring arms extend in opposite directions substantially along said plane and substantially along the directions of insertion and ejection of said recording medium cartridge with respect to said cartridge holder.

10. A cartridge holding mechanism according to claim 9, wherein:

said first spring arm extends substantially parallel to said first side; and said second spring arm is formed laterally inside of said first spring arm substantially along said plane and includes a first portion extending substantially parallel to said first side and a second portion extending from said first portion toward said first side so as to be inclined substantially along said plane with respect to said first side.

11. A cartridge holding mechanism according to claim 10, wherein said third spring arm is inclined substantially along said plane with respect to said second side.

12. A cartridge holder according to claim 10, wherein each of said first, second, and third spring arms has a length not less than ½ of the length of said cartridge inserted in said cartridge holder along the directions of insertion and ejection of said cartridge.

13. A cartridge holding mechanism according to claim 9, wherein said first spring arm has a first projection at a front end portion thereof and said second spring arm has a second projection at a front end portion thereof.

14. A cartridge holding mechanism according to claim 13, wherein a distance between said first and second projections is set to not less than ½ of the longitudinal length of said cartridge holder.

15. A cartridge holder according to claim 13, wherein each of said first and second projections is spaced a distance not greater than 9 mm from said first side, and said third projection is spaced a distance not greater than 9 mm from said second side.

16. A cartridge holding mechanism for a storage device, comprising:

a base;

a cartridge holder having a main surface extending generally along a plane for holding a recording medium cartridge inserted in said storage device; and a spring arm formed integrally with said main surface of said cartridge holder, said spring arm having a projection at a front end portion thereof, said spring arm extending substantially along said plane so as to be inclined substantially along said plane with respect to a longitudinal center line of said cartridge holder.

* * * * *